United States Patent [19]

Hatsopoulos et al.

[11] 3,791,372
[45] Feb. 12, 1974

[54] HEAT PIPE COOKING APPLIANCE

[75] Inventors: George N. Hatsopoulos; Lazaros J. Lazaridis, both of Lincoln; Edward F. Searight, Harvard, all of Mass.

[73] Assignee: Thermo Electron Corporation, Waltham, Mass.

[22] Filed: July 12, 1972

[21] Appl. No.: 270,932

[52] U.S. Cl. ................. 126/390, 219/439, 219/444
[51] Int. Cl. .......................................... A47j 27/24
[58] Field of Search .... 165/105; 126/376, 377, 378, 126/390; 219/444, 447, 530

[56] References Cited
UNITED STATES PATENTS

| | | | |
|---|---|---|---|
| 3,603,767 | 9/1971 | Scicchitano | 219/439 |
| 3,509,319 | 4/1970 | Perl | 219/444 |
| 3,643,346 | 2/1972 | Lester | 34/202 |
| 3,354,040 | 11/1967 | Frame et al. | 176/30 X |
| 3,276,965 | 10/1966 | Leyse | 176/22 |
| 3,378,447 | 4/1968 | Mittelman | 176/17 X |
| 3,607,629 | 9/1971 | Frisch | 176/36 |

*Primary Examiner*—Carroll B. Dority, Jr.
*Assistant Examiner*—William C. Anderson
*Attorney, Agent, or Firm*—James L. Neal

[57] ABSTRACT

Cooking utensils incorporating heat-pipe heat transfer units in a unitary hand-portable structure are constructed in the form of a pot or a pan having a heat-receiving member extending therefrom and a food heating zone in the pot or pan. Each utensil has a sealed enclosure containing a working fluid which in operation is vaporized in the heat receiving zone and condenses under the pan to yield heat of vaporization for cooking purposes. A cooking station has a table or counter top that is clear, and a back-wall supporting one or more heat-sources behind apertures provided for passage of the projecting heat-receiving members of the utensils therethrough into thermal-transfer relation with the heat sources. A utensil is engaged with a heat source by resting it on the counter top and pushing its projecting heat-receiving member through the back wall into engagement with a heat source, and is taken out of use by simply pulling it away from the back wall. The utensils are completely sealed and may be handled and cleaned like ordinary pots and pans. Thermal monitoring may be done by sensing temperature at the heat receiving member of a utensil outside the heat source being used.

11 Claims, 3 Drawing Figures

PATENTED FEB 12 1974 3,791,372

HEAT PIPE COOKING APPLIANCE

BACKGROUND OF THE INVENTION

Food preparation apparatus wherein heat is transferred from a heat source to a food preparation surface by a vaporized working fluid is disclosed and claimed in an earlier application for letters patent Ser. No. 165,569 and now abaondoned of Lazaridis, Searight and Shefsiek filed July 23, 1971 which is assigned to the same assignee as the present application. As is explained in that earlier application, working fluid is confined in a sealed enclosure which extends from the heat source to the food preparation surface. The working fluid is vaporized at a surface adjacent the heat source and fills the sealed enclosure. It then condenses on a portion of the sealed enclosure adjacent the food preparation surface and releases heat energy. The apparatus used in this form of heat transfer is sometimes called a "heat pipe." Advantages of this mode of food preparation over prior modes involving use of heat sources applied directly to cooking surfaces or to foodstuffs are stated in the earlier application, and may be referred to herein. Among those advantages are that there is no open flame, and the cooking surface temperature will be significantly less than that of an open gas flame, or of an electrically heated cooking unit. Thus, while gas flames have temperatures approximately 2,000° F, and "Calrod" electric heating units go to approximately 1,200° F, cooking surfaces heated by condensing vapor may work at a temperature approximately 600° F. Heat is extracted by the food being cooked essentially entirely from the condensation of the confined vapor, being the latent heat of vaporization transferred from the heat source to the cooler body of foodstuff.

BRIEF SUMMARY OF THE INVENTION

Cooking utensils that are presently available for use on a range generally involve the application of a heat source directly to one side of a partition (e.g: the bottom) of a vessel or container the opposite side of which is in direct contact with the food material to be cooked. Thus, the temperature of a flame or of an electric heating unit is applied with little drop directly to the food material and, as most people have experienced, burnt food is common.

Heat pipe cooking utensils are herein disclosed which employ a confined working fluid in a hand-portable unitary structure having a cooking surface and a heat-receiving member extending away from that surface for mating connection with an enclosed heat source. The cooking surface can be given a desired maximum temperature, and the heat of vaporization will be released essentially only to a cooler body that is placed on the cooking surface, in an isothermal fashion, as is taught in the above-mentioned earlier application. In preferred embodiments of these cooking utensils, the heat-receiving member projects to one side of the cooking surface, and may be parallel thereto, and elevated above the plane of the cooking surface. Capillary means beneath the cooking surface carries condensed working fluid to the heat-receiving member.

Also disclosed is a range which has heating means enclosed behind a back wall of a counter or table top, with an aperture through the back wall for receiving the heat-receiving member of a cooking utensil. In this way, using a preferred embodiment of the utensil, the latter can be rested on the counter top and by pushing its heat-receiving member through the back-wall aperture into mating engagement with a heating means the cooking utensil can be placed in operation. Controls for the heating means can be both manual and automatic. Because the cooking utensil operates on a principle which is substantially isothermal, in that the working fluid is kept at its vaporization temperature during operation, thermostatic control of the heat source is feasible with a thermostat mounted on the front surface of the back wall, insulated from the heat source, where it can come under the influence of the temperature of the heat-receiving member of the cooking utensil. Thus, the utensil can monitor its own heat source without having in its structure any thermostatic control component. The heat source or sources used in the range may take any form. A jet-impingement gas burner, as disclosed, for example, in U.S. Pat. No. 3,667,745 of Lazaros J. Lazaridis issued June 6, 1972 and assigned to the same assignee as the present application, is described herein as a preferred embodiment.

Utensils according to the invention are rugged and totally devoid of extraneous control elements, power cords, or the like. They can be immersed in boiling water, and can be cleaned like ordinary pots and pans, as will appear more fully from the description of exemplary embodiments which follows.

DETAILED DESCRIPTION OF THE DRAWINGS

Figure 1:
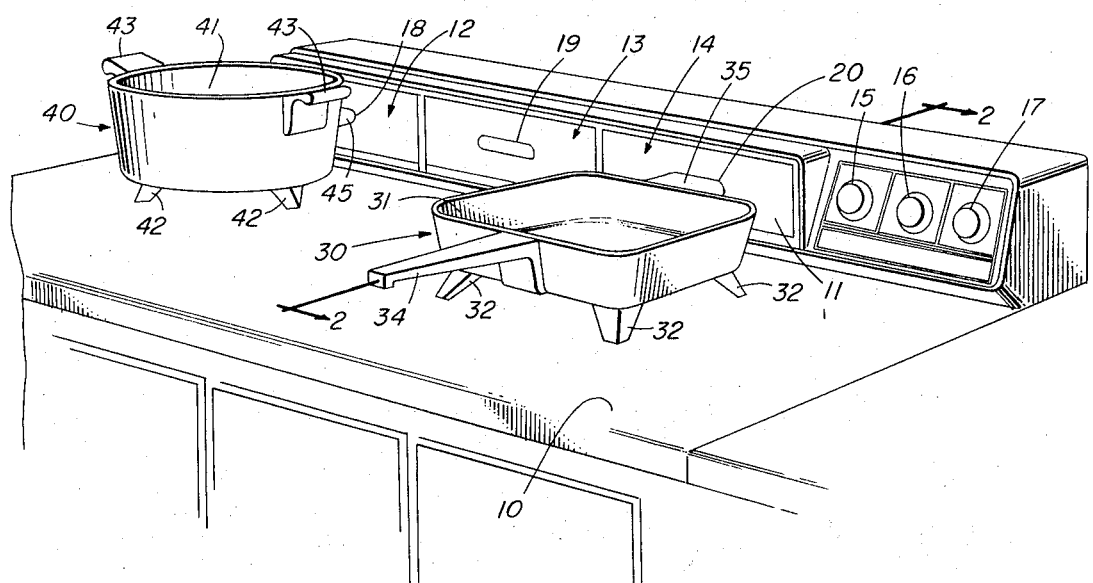
FIG. 1 shows a counter-top range with two cooking utensils in place on it; heating units are incorporated in the back wall.
Figure 2:
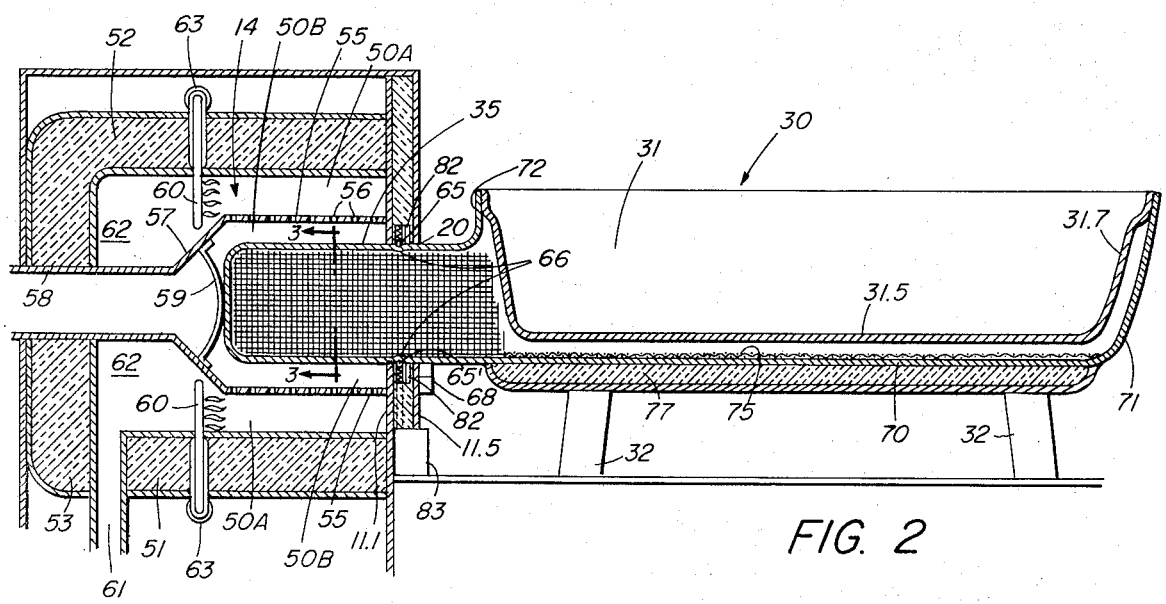
FIG. 2 is a cross-sectional view of a heat pipe utensil in mating relation with a jet impingement gas burner, taken along line 2—2 in FIG. 1.

In FIG. 1 a cooking station comprises a counter top 10 which has a back wall 11 fitted with three heat sources generally indicated at 12, 13 and 14 each being manually controllable from a control panel having respective control knobs 15, 16 and 17. A section through the third heat source 14 is shown in FIG. 2; this is representative of all three heat sources. Each heat source is located behind the back wall 11, and an aperture 18, 19, 20 respectively is provided through the back wall. As will presently be explained, each aperture may be fitted with closure means (not shown) for covering the heat source behind it when the heat source is not in use.

A cooking utensil 30 comprising a pan 31 on legs 32 and having a handle 34 rests on the counter top 10 and has a projecting member 35 withdrawably inserted through the third aperture 20 inter thermal-transfer relation with the third heat source 14. Another cooking utensil 40 having a deeper pan 41 on legs 42 and fitted with side handles 43 is similarly mated by a projecting member 45 passing through the first aperture 18 with the first heat source 12. While the utensils 30 and 40 have the shape and appearance of ordinary pots and pans, and can be handled like ordinary pots and pans, each incorporates a "heat pipe" for heat transfer of which the projecting member 35 or 45, respectively, is the heat-receiving zone. To put the utensil into use, it is necessary only to rest it on the counter top 10, like any ordinary pot or pan, insert its projecting member through an aperture in the back wall 11 giving access to a heat source and push the pan toward the back wall until the heat receiving zone is fully engaged in heat transfer relation with the heat source. Then the control knob 15, 16 or 17 for that heat source is operated to turn it on. The utensil can be taken out of use simply by pulling it away from the back wall until its heat receiving zone is disengaged from the heat source. As will appear below, the cooking station can be fitted with control means for thermo-statically controlling each heat source in response to the temperature of the utensil coupled to it, control means for shutting down each heat source when a utensil is decoupled from it or for preventing activation of a heat source in the absence of a load coupled to it.

The heat source 14 shown in FIG. 2 is a jet-impingement type gas burner taking a form that is in substance like the Crucible Furnace that is described and claimed in above-referenced patent of Lazaridis. While other forms of heat sources can be used with utensils according to the invention, the jet-impingement type of burner is preferred for its high efficiency where a gas combustion heat source is chosen. The heat-receiving zone 35 of the cooking utensil 30 takes the place in the present invention of the crucible 16 shown in the Lazaridis patent. Fitted to the rear of the back wall 11 is a chamber 50 surrounded by insulated walls 51, 52 and 53 within which is supported a perforated baffle 55, having several holes 56 through it. The baffle is fitted at one end to the wide end of a cone-shaped unperforated baffle 57 which in turn is fitted at its narrower end to an exhaust flue 58. A pan stop 59 is fitted across the cone-shaped baffle 57. The perforated baffle 55 is butted at its other end to the back side 11.1 of the back wall 11. The baffle and cone 55, 57 are spaced from both the inner surfaces of the walls 51, 52, 53 of the chamber 50 and the outer walls of the heat-receiving member 35 of the utensil (when the latter is in place for receiving heat in the heat source 14), dividing the chamber 50 into two parts 50A and 50B. Gas burners 60 are located in the first or outer chamber part 50A, to which combustion-supporting air is brought over an air intake conduit 61 and plenum 62. A gas feed conduit 63 surrounds the heat source outside the chamber walls 51 and 52.

As is explained in the Lazaridis patent, fuel and combustion air (which may be pre-heated) are separately introduced into the first chamber part 50A, turbulently mixed, and ignited. The baffle 55 is perforated in a pattern of holes 56 which serve to direct combustion gases in the form of jets upon the outer wall of the heat-receiving member 35 of the utensil 30. This action enhances heat transfer by disrupting stagnant boundary layers of gas along the walls of the heat-receiving member, contributing to the uniformity of heat distribution in the heat-receiving member and contributing in achieving high overall heat transfer coefficient. The products of combustion are drawn out through the flue 58. A spark ignition system having a flame ignition detector (not shown) may be employed for shutting down the gas supply (as is well-known) in the event the combustion fails to start within an interval of time considered safe. The aperture 20 in the back wall 11 of the counter is sealed by a gasket 82 which tightly but slippably engages the outer wall of the heat-receiving member, so that products of combustion will not come out through the opening 20. Ball-and-spring detent latches 65 and 65' are fitted in the periphery of the opening 20 for engagement with indexing dimples 66 in the outer surface of the heat-receiving member 35 of the utensil 30. These index-latches together with the pan-stop 59 assure that the heat-receiving member is located in an optimum heat-receiving relation with the heat source 14. One latch 65' comprises a push rod engaging a safety switch 83 for cutting off the gas supply when the heat-receiving member 35 is not present in the heat source 14. A thermostat sensor 68 is mounted on the outer surface 11.5 of the back-wall 11, facing the counter top 10, in contact with, or otherwise in a position to come under the thermal influence of, the heat receiving member 35 outside the heat source 14, for controlling the heat source responsive to the temperature of the outer surface of the heat receiving member outside the heat source. Because the utensil 30 is operated essentially isothermally, the temperature at the heat-receiving member 35 just outside the heat source will be essentially the same as the temperature in the pan 31, and particularly at the bottom surface 31.5 of the pan which constitute the major portion of the cooking surface. Since the vapor can condense against the side surfaces 31.7 of the pan, these surfaces are also a part of the isothermal cooking surface.

Figure 3:
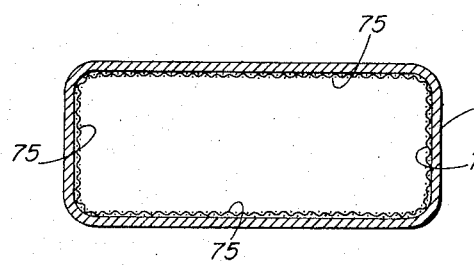
FIG. 3 is a cross-section on line 3—3 of FIG. 2 showing a preferred form of the heat-receiving member of the utensil.

Heat pipe structure of the utensil 30 is provided by the sealed enclosure formed by the walls of the heat-receiving member 35, the bottom outer wall 70 extending from the heat-receiving member (as seen in the sectional-view of FIG. 2) to the outer upstanding wall 71, continuing into the folded-back inner wall 31.8 of the pan 31, the bottom wall 31.5 and the inner wall 31.7 of the pan, and sealed connection of the latter inner wall with an outer wall 72 continuing back to the upper wall of the heat-receiving member. These walls can all be made of stainless steel, and the pan can be affixed, as be welding, at the upper periphery of the outer side walls 71, 72. Capillary means 75 are located on the inner surface of the bottom outer wall 70, spaced from the bottom wall 31.5 of the pan, for returning condensed fluid to the heat receiving member 35. As is shown in FIG. 3, these capillary means extend into the heat-receiving member and preferably line the entire inside walls of it. Thus, the utensil 30 includes a casing enclosing a working fluid (not shown) and defining a relatively large flat cooking surface as well as a pan for holding food, which may be in liquid form.

Working fluids suitable for use in food cooking applications of heat pipes, and their properties, are described in the above mentioned application of Lazaridis et al. As is therein stated, practical working fluids at operating temperatures associated with food preparation are hydrocarbon oils and silicon based oils, although for relatively low temperatures water may be used as a working fluid. Also, as is pointed out in said application, it is preferable that the interior volume of the enclosure of the utensil 30 be substantially evacuated of air and backfilled with the desired amount of working fluid. The system is isothermal and operable over a wide range of temperatures. The system will operate without evacuation, but operation will be non-isothermal and over a reduced temperature range. The amount of working fluid sealed within a utensil may vary, but an amount which, when in the liquid state, is sufficient to saturate the capillary structure yields good performance.

The enclosure of the utensil 30, its associated capillary structures 75 and working fluid (not shown) operate in a manner which corresponds to heat pipe theory. The operation is very nearly isothermal with the evaporation and condensation of working fluid taking place at a single working pressure which is constant throughout the interior of the casing. In fact, however, small temperature and pressure gradients exist. The system, though closely approximating constant temperature and constant pressure operation, actually operates in the following manner. As the working fluid vaporizes, the pressure at the surface of evaporation increases. The result is a small pressure differential within the enclosure between the heated surface of member 35 and the cooking surface 31.5 which causes vapor to move toward the cooking surface where it encounters a temperature lower than the temperature present at the surface of evaporation in the heat-receiving member 35. As a consequence, the vapor condenses on the underside of the cooking surface and releases the thermal energy stored in its heat of evaporation. As the fluid condenses, the vapor pressure adjacent the cooking surface 31.5 decreases so that the relatively small pressure differential necessary for continued vapor heat flow is maintained. The vaporized fluid stores heat energy at the temperature at which the vapor was created and retains the energy at this temperature until it meets a cooler surface. The result is that the temperature across the enclosure tends to remain constant.

The pan 30 has a layer of insulation 77 outside (and beneath) the bottom outer enclosure wall 70, to prevent heat loss from condensed working fluid in the enclosure on the other side of that wall. If all or a part of that insulation is removed, heat can be applied directly to the outer wall 70, enabling the utensil to be used over an open flame or in contact with an electric heater at its bottom wall 70, in which case the heat-receiving projection 35 is not needed, and a utensil is provided for use with prior-existing cooking ranges. While the advantages of superior heat transfer and a free counter top would then be given up, the utensil as so modified would retain the advantages of heat-pipe cooking, such as isothermal cooking surface and controlled cooking temperature at a lower level than is practical with ordinary utensils making direct thermal contact to the heating source.

We claim:

1. In food preparation apparatus consisting essentially of a sealed enclosure having along a first portion thereof a food-heating zone and at a second portion thereof a heat-receiving zone, and working fluid means within said sealed enclosure for transferring heat from said second portion to said first portion primarily by vaporization in said heat-receiving zone and condensation in said food-heating zone, the improvement comprising an enclosure embodying both said zones in a unitary hand-portable structure in which said food-heating zone comprises a platform for receiving thereon food to be heated by condensation of said fluid beneath said platform and said heat-receiving zone comprises a projecting member dimensioned to interfit removably with a source of heat.

2. Food preparation apparatus according to claim 1 in which said heat-receiving projecting member extends from one side of said structure substantially parallel to said platform.

3. Food preparation apparatus according to claim 2 having capillary means within said enclosure extending from beneath said platform to said projecting member for returning condensed fluid to said projecting member.

4. In combination, food preparation apparatus comprising:
    a. a unitary hand-portable structure forming a sealed enclosure having along a first portion thereof a food-heating zone and at a second portion thereof a heat-receiving zone, and working fluid means within said sealed enclosure for transferring heat from said second portion to said first portion primarily by vaporization in said heat-receiving zone and condensation in said food-heating zone, said food-heating zone comprising a platform for receiving thereon food to be heated by condensation of said fluid beneath said platform and said heat-receiving zone comprising a projecting member; and
    b. a food preparation station comprising heat source means at said station providing coupling means for removably mating with said projecting member of said structure in a thermal-transfer relation, and means to activate said heat source means to provide heat through said coupling means when said projecting member of said structure is mated therewith.

5. A combination according to claim 4 including temperature sensing means for controlling said heat source means, said sensing means being located at said station substantially thermally insulated from said heat source means but within the thermal influence of said structure for sensing the temperature of said structure and controlling said heat source means in response thereto.

6. A conbination according to claim 5 in which said sensing means is located to be within the thermal influence of said projecting member.

7. In a combination according to claim 4, a food preparation station comprising means providing a flat surface for holding said unitary structure, an upstanding back wall bounding the rear of said flat surface and having an aperture for receiving said projecting member of said structure and heat source means for said projecting member located behind said back wall in register with said aperture, whereby said unitary structure can be rested on said flat surface and pushed toward said back wall to insert said projecting member into and through said aperture for coupling to said heat source means, and can be decoupled from said heat source means by withdrawal from said back wall while resting on said flat surface.

8. In the combination according to claim 7 temperature sensing means carried by said back wall for controlling said heat source means, said temperature sensing means being located in a place that is substantially insulated from said heat source means but within the thermal influence of said unitary structure when said projecting member is present in said aperture in coupled relation with said heat source means.

9. In the combination according to claim 4, cooperating latch means fitted in part to said coupling means and in part to said projecting member for optimally mating said coupling means with said projecting member.

10. A combination according to claim 4 in which said means to activate said heat source means includes interlocking means for disabling said heat source means in the absence of said projecting member.

11. A combination according to claim 4 in which said means to activate said heat source means includes interlocking means for disabling said heat source means if said heat source means is not activated within a prescribed time after starting.

* * * * *